United States Patent
Vollmer

(10) Patent No.: US 7,141,905 B2
(45) Date of Patent: Nov. 28, 2006

(54) PERMANENT MAGNET SYNCHRONOUS MACHINE

(75) Inventor: Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 11/108,076

(22) Filed: Apr. 15, 2005

(65) Prior Publication Data

US 2005/0231060 A1 Oct. 20, 2005

Related U.S. Application Data

(63) Continuation of application No. PCT/DE03/03364, filed on Oct. 10, 2003.

(30) Foreign Application Priority Data

Oct. 18, 2002 (DE) .................... 102 48 771

(51) Int. Cl.
*H02K 1/00* (2006.01)

(52) U.S. Cl. ..................... 310/216; 310/162

(58) Field of Classification Search ........... 310/254, 310/216–218, 259, 51, 261, 162, 168
See application file for complete search history.

(56) References Cited

U.S. PATENT DOCUMENTS

| 4,757,220 A | 7/1988 | Pouillange |
| 5,418,416 A | 5/1995 | Muller |
| 5,744,888 A | 4/1998 | Zajc et al. |
| 5,910,691 A * | 6/1999 | Wavre ..................... 310/12 |
| 6,107,718 A * | 8/2000 | Schustek et al. ........... 310/218 |
| 6,133,663 A | 10/2000 | Hoemann |
| 6,181,047 B1 * | 1/2001 | Nitta ..................... 310/254 |
| 6,288,471 B1 * | 9/2001 | Kometani et al. .......... 310/254 |
| 6,313,557 B1 * | 11/2001 | De Filippis et al. ........ 310/216 |
| 6,313,558 B1 * | 11/2001 | Abukawa et al. ........... 310/254 |
| 6,452,303 B1 * | 9/2002 | Marioni ................... 310/254 |
| 6,504,284 B1 * | 1/2003 | Kazama et al. ............ 310/259 |
| 6,552,451 B1 * | 4/2003 | Ikegami et al. ........... 310/49 R |
| 6,583,530 B1 * | 6/2003 | Hsu ....................... 310/254 |
| 6,628,031 B1 * | 9/2003 | Vollmer ................ 310/156.45 |
| 6,759,785 B1 * | 7/2004 | Miyake et al. ............ 310/254 |
| 6,788,013 B1 * | 9/2004 | Islam et al. .............. 318/432 |
| 6,844,653 B1 * | 1/2005 | Kolomeitsev et al. ...... 310/218 |
| 6,880,229 B1 * | 4/2005 | Zepp et al. ................. 29/596 |
| 6,903,476 B1 * | 6/2005 | Sakamoto ............. 310/156.64 |
| 6,919,665 B1 * | 7/2005 | Murakami et al. ........ 310/216 |
| 2002/0130575 A1 | 9/2002 | Tajima et al. |

FOREIGN PATENT DOCUMENTS

| DE | 197 04 769 A1 | 9/1998 |
| DE | 101 33 654 A1 | 2/2003 |
| JP | 11206085 A | 7/1999 |

* cited by examiner

*Primary Examiner*—Tran Nguyen
(74) *Attorney, Agent, or Firm*—Henry M. Feiereisen

(57) ABSTRACT

A permanent magnet synchronous machine includes a stator, and a rotor which defines with the stator an air gap. The stator includes a plurality of teeth which are disposed in spaced-apart circumferential relationship and separated from one another by a tooth pitch. Each of the teeth has a shaft which terminates in a tooth head adjacent the air gap, with the tooth heads of neighboring teeth being separated from one another by a slot. The tooth heads are constructed to prevent saturation. The rotor has permanent magnets which are aligned in flux concentration direction and arranged to define a pole pitch, wherein a pitch ratio of tooth pitch to pole pitch is $\geq 2.5$.

22 Claims, 3 Drawing Sheets

PERMANENT MAGNET SYNCHRONOUS MACHINE

CROSS-REFERENCES TO RELATED APPLICATIONS

This application is a continuation of prior filed copending PCT International application no. PCT/DE2003/003364, filed Oct. 10, 2003, which designated the United States and on which priority is claimed under 35 U.S.C. §120 and which claims the priority of German Patent Application, Serial No. 102 48 771.5, filed Oct. 18, 2002, pursuant to 35 U.S.C. 119(a)–(d).

BACKGROUND OF THE INVENTION

The present invention relates, in general, to a permanent magnet synchronous machine.

Nothing in the following discussion of the state of the art is to be construed as an admission of prior art.

A permanent magnet synchronous machine of a type involved here includes a stator and a rotor which together define an air gap. The stator includes teeth which have each a radial tooth pole and an axially extending tooth head, whereby the tooth heads are arranged adjacent the air gap and neighboring tooth heads in circumferential direction are spaced from one another by a slot. The rotor includes permanent magnets which are arranged in flux concentration direction.

The tooth heads become saturated when the flux density within the is high enough. As a result, increased losses are experienced. This problem has been addressed heretofore by preventing such flux densities within the air gap. The radial extension of the tooth heads is hereby kept as small as possible in order to realize a greatest possible slot cross section.

It would be desirable and advantageous to provide an improved permanent magnet synchronous machine which is effective and reliable in operation, even when subject to increased flux density within the air gap.

SUMMARY OF THE INVENTION

According to one aspect of the present invention, a permanent magnet synchronous machine includes a stator and a rotor defining with the stator an air gap and having permanent magnets which are aligned in flux concentration direction and arranged to define a pole pitch, wherein the stator has a plurality of teeth disposed in spaced-apart circumferential relationship and separated from one another by a tooth pitch, each of the teeth including a tooth pole terminating in a tooth head adjacent the air gap, with the tooth heads of neighboring teeth being separated from one another by a slot, wherein the tooth heads are constructed to prevent saturation, wherein a pitch ratio of tooth pitch to pole pitch is $\geq 2.5$.

A pitch ratio of tooth pitch to pole pitch of $\geq 2.5$ and the alignment of the permanent magnets of the rotor in flux concentration of the rotor results in a flux density within the air gap that would cause the tooth heads to saturate. However, as a consequence of the configuration of the tooth heads saturation effects are prevented. Suitably, the tooth height of the tooth head is suited to the construction-dependent air gap flux density. This is necessary because the flux lines close across the tooth heads to neighboring permanent magnets. It is hereby not required to direct the flux line in the tooth pole or in the back of the stator yoke. As a result, novel solutions can constructively be pursued because there is no longer any need to construct the yoke and the tooth pole to suit such flux densities is eliminated. In other words, the tooth as well as the yoke can be made significantly narrower so that smaller installation heights can be realized.

According to another feature of the present invention, the tooth heads may have a same height in the circumferential direction.

According to another feature of the present invention, the tooth heads may each have a height which satisfies the requirement $h_{zk} \geq \tau_p/2$ at least from a point $\tau p/2$ and based on the condition of $b \leq \tau_p/2$, wherein $h_{zk}$ is the height of the tooth head, $\tau_p$ is the pole pitch, and b is the slot opening width.

According to another feature of the present invention, the stator may be made of different materials. For example, the tooth heads may be made of magnetizable material whereas the tooth pole and the yoke may be made of amagnetic material. These materials may be plastic which are much lighter than iron. The stator may thus have a star-shaped configuration.

According to another feature of the present invention, the stator may have different tooth pitches in the circumferential direction so that slot openings between neighboring teeth are off-center between symmetry axes of the teeth. Suitably, only the tooth poles with wider tooth heads are provided with exciter coils. Advantageously, these tooth poles are attached to the yoke via a snap connection so that the exciter coils can be mounted beforehand.

According to another feature of the present invention, the stator may be made of axially stacked laminations which are produced from single segmental sheets or are of single-piece construction, wherein the laminations are arranged in a predetermined sequence.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
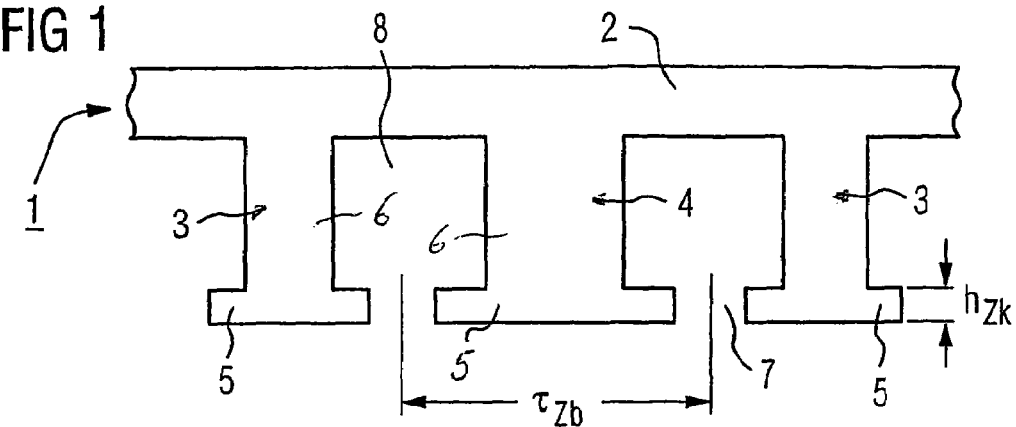
FIG. 1 is a fragmentary schematic illustration of a first variation of a stator with teeth and tooth heads for a permanent magnet synchronous machine according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 5:
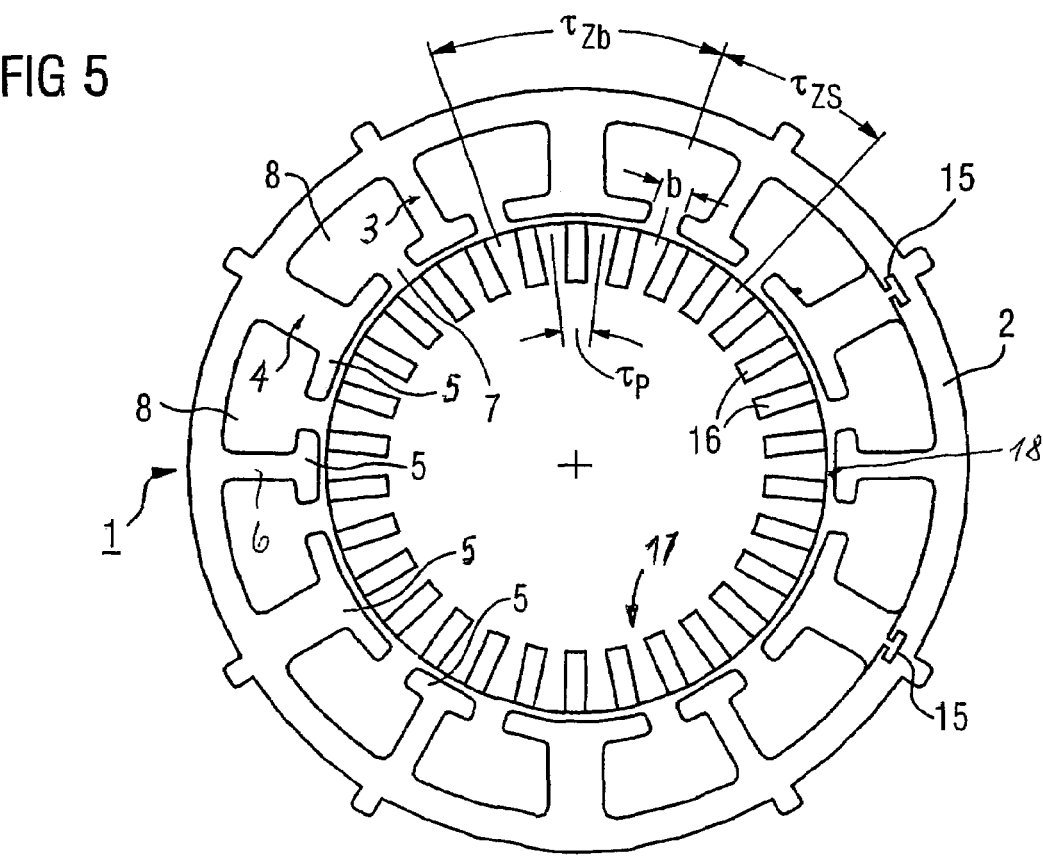
FIG. 5 is a sectional view of a permanent magnet synchronous machine according to the present invention.

Turning now to the drawing, and in particular to FIG. 1, there is shown a fragmentary schematic illustration of a first variation of a stator, generally designated by reference numeral 1, for a permanent magnet synchronous machine according to the present invention. The stator 1 includes a stator yoke 2, and a first plurality of teeth 3 and a second plurality of teeth 4 whereby the teeth 3, 4 have different configurations and extend inwardly from the yoke 2 towards an air gap 18 defined between the stator 1 and a rotor 17 (FIG. 5). The teeth 3, 4 have each a tooth pole 6 with a first end connected to the yoke 2, and a second end, opposite to the first end and forming a tooth head 5 adjacent to the air gap 18 between the stator 1 and the rotor 17. Each tooth 3 is separated from a neighboring tooth 4 by a slot 8 which may accommodate, for example, a winding of a coil and is semi-open to form slot openings 7 between confronting ends of neighboring tooth heads 5, with the slot openings defined by a slot opening width "b" (FIG. 5).

As described above, the teeth 3, 4 have different configuration and the tooth poles 6 have different widths because of a different length between tooth heads 5, as viewed in the circumferential direction. Thus, the teeth 3, 4 conduct different fluxes during operation. The tooth heads 5 of the teeth 3, 4 have a same height $h_{zk}$, although this is not necessarily required. In other words, the height of the tooth heads 5 may also vary.

Figure 2:
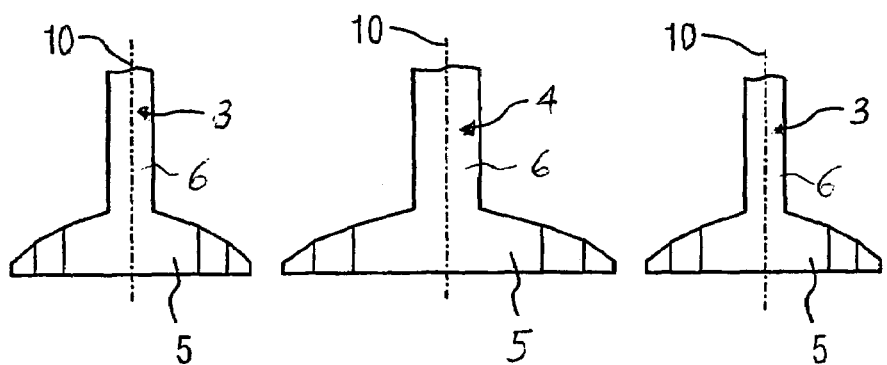
FIG. 2 is a schematic illustration of a modified stator.
Figure 3:
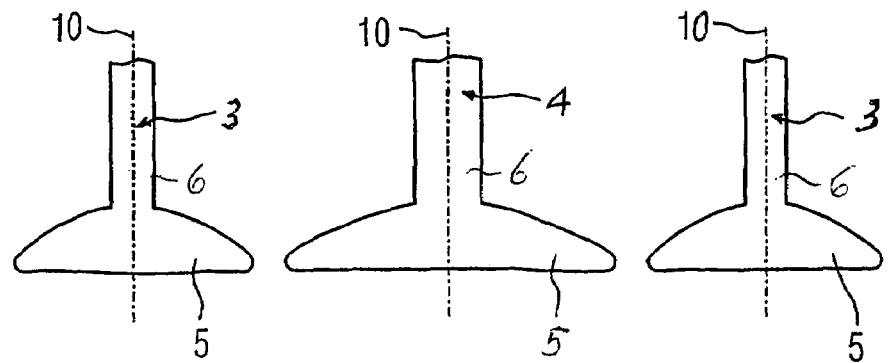
FIG. 3 is a schematic illustration of still another variation of a stator.
Figure 4:
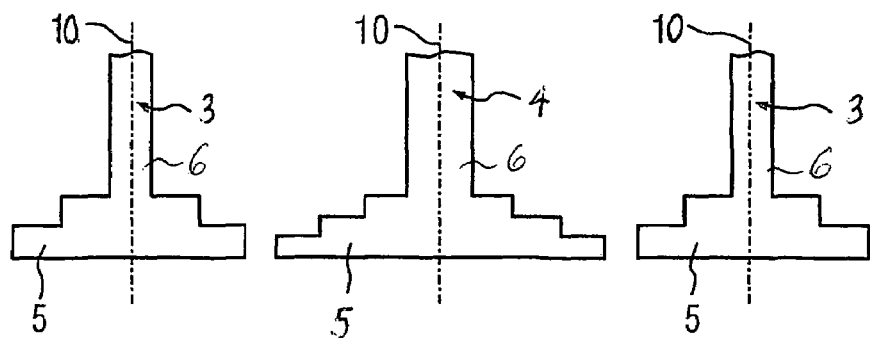
FIG. 4 is a schematic illustration of yet another variation of a stator.

The tooth heads 5 are configured to prevent saturation. FIG. 1 shows the tooth heads 5 of substantial rectangular configuration. FIGS. 2 to 4 show different configurations of the tooth heads 5 to prevent saturation. FIG. 2 shows hereby tooth heads 5 with flat bottom face and a top face comprised of a sequence of straight sections to resemble a curved configuration. FIG. 3 shows tooth heads 5 with flat bottom face and curved top face, whereas FIG. 4 shows tooth heads 5 with flat bottom face and stepped top face. The variations of the configuration of the tooth heads 5, as shown in FIGS. 2 to 4, assist a flux conduction and provide weight saving.

Common to all variations of the tooth heads 5, as shown in FIGS. 2 to 4 is the shallower configuration of the tooth heads 5 in their marginal regions in relation to their symmetry axis 10, compared to the area of the tooth heads 5 adjacent the symmetry axis 10. This results in weight saving and material cost savings.

The teeth 3, 4 are disposed in alternating relationship about the circumference, whereby the distance between two slot openings 7 to either side of a tooth 4 is designated by a tooth pitch $\tau_{zb}$, whereas the distance between two slot openings 7 to either side of a tooth 3 is designated by a tooth pitch $\tau_{zs}$.

Referring now to FIG. 5, there is shown a sectional view of a permanent magnet synchronous machine according to the present invention, illustrating single laminations of the stator 1 with teeth 3, 4 having tooth heads 5 of same height $h_{zk}$ and different tooth pitches $\tau_{zb}$ and $\tau_{zs}$. The stator 1 is arranged in surrounding relationship to the rotor 17 at a distance thereto to define the air gap 18. The rotor 17 includes a rotor core with a plurality of permanent magnets 16 positioned about the circumference of the rotor core. The distance of pole midsections between two neighboring magnets 16 defines the pole pitch $\tau_p$. In the example of FIG. 5, the stator 1 has twelve slots 3, 4, whereas the rotor 17 has thirty slots so that the stator slot/rotor slot ratio is 12/30.

As a consequence of the construction of the rotor 17 with the permanent magnets 16 aligned in flux concentration, and the construction of the stator 1, the teeth 3, 4 as well as the yoke 2 can be dimensioned smaller than prior art electric machines because the magnetic field of the permanent magnets 16 extends essentially across the tooth heads 5. Thus, relatively large slot surfaces are created for the windings, especially of copper.

In accordance with the present invention, the pitch ratio of tooth pitch $\tau_{zb}$ in a unit of length to pole pitch $\tau_p$ in a unit of length is $\geq 2.5$. The tooth heads 5 may hereby have a height which satisfies the requirement $h_{zk} \geq \tau_p/2$ at least from a point $\tau_p/2$, whereby b $\leq \tau_p/2$.

Figure 6:
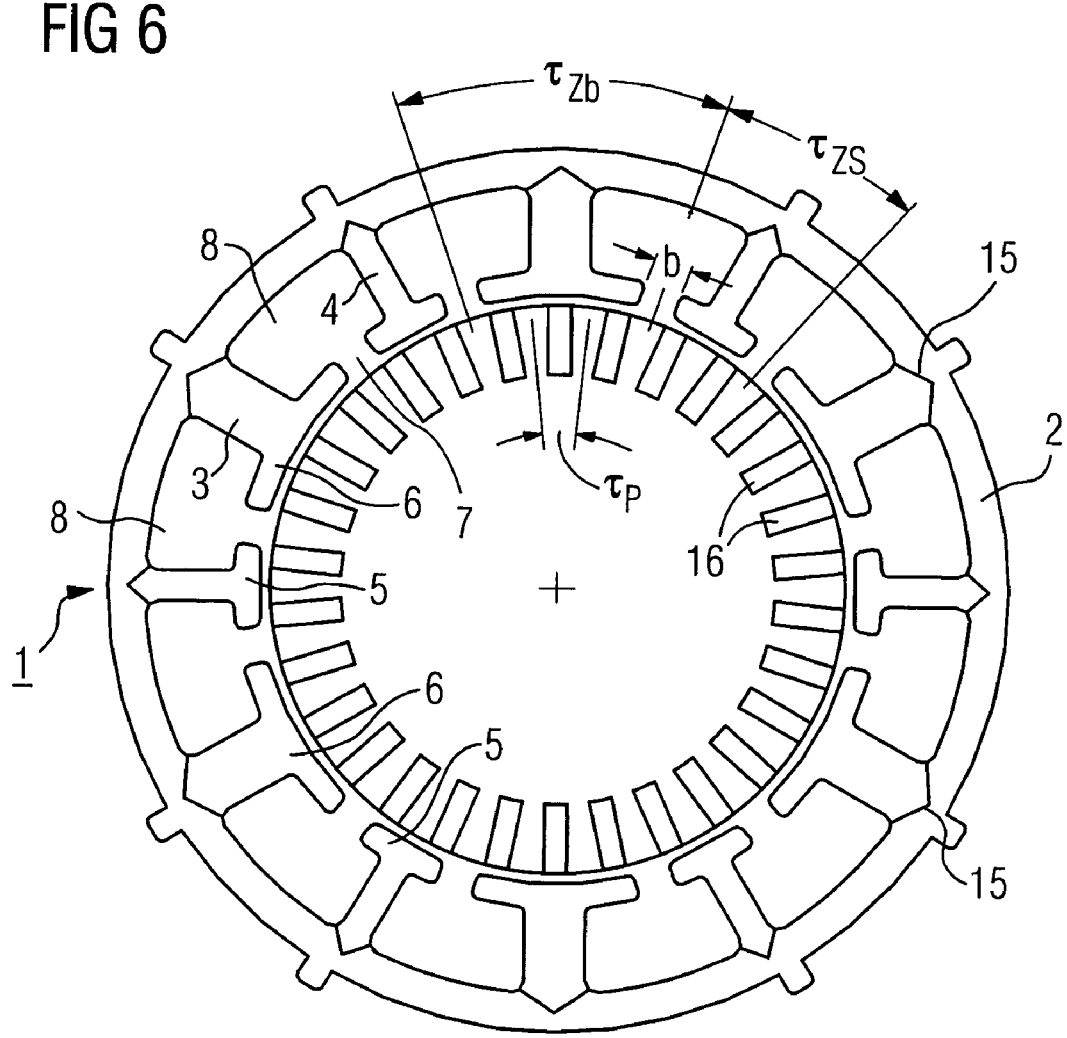
FIG. 6 is a sectional view of a modified permanent magnet synchronous machine according to the present invention.

While FIG. 5 shows essentially a single-piece configuration of a stator lamination, it is of course also conceivable to connect and properly position the teeth 3, 4 with their tooth heads 5 to the yoke 2 by using a form-fitting connection or frictional engagement, as indicated in FIG. 5 by way of a snap connection 15. It is also conceivable to provide a combination of single-piece laminations with multi-part laminations. FIG. 6 is a sectional view of a modified permanent magnet synchronous machine according to the present invention, with the stator 1 having a star-shaped configuration.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A permanent magnet synchronous machine, comprising:
    a stator; and
    a rotor defining with the stator an air gap and having permanent magnets which are aligned in flux concentration direction and arranged to define a pole pitch,
    wherein the stator includes a plurality of teeth disposed in spaced-apart circumferential relationship and separated from one another by a tooth pitch, each of the teeth including a tooth pole terminating in a tooth head adjacent the air gap, with the tooth heads of neighboring teeth being separated from one another by a slot, said tooth heads being constructed to prevent saturation,
    wherein a pitch ratio of tooth pitch to pole pitch is $\geq 2.5$.

2. The synchronous machine of claim 1, wherein the tooth heads have a same height in the circumferential direction.

3. The synchronous machine of claim 1, wherein the tooth heads have each a height which satisfies the requirement $h_{zk} \geq \tau_p/2$ at least from a point $\tau_p/2$, whereby b$\geq \tau_p/2$, wherein $h_{zk}$ is the height of the tooth head, $\tau_p$ is the pole pitch, and b is the slot opening width.

4. The synchronous machine of claim 1, wherein the teeth of the stator are arranged in a star-shaped configuration.

5. The synchronous machine of claim 1, wherein the stator is made of different materials.

6. The synchronous machine of claim 1, wherein the stator has different tooth pitches in the circumferential direction so that slot openings between neighboring teeth are off-center between symmetry axes of the teeth.

7. The synchronous machine of claim 1, wherein the stator is made of axially stacked laminations which are made of single segmental sheets or of single-piece construction, said laminations being arranged in a predetermined sequence.

8. The synchronous machine of claim 1, wherein the tooth heads have a same radial height.

9. The synchronous machine of claim 1, wherein the stator has a stator yoke for connection of the teeth, wherein the tooth heads, on one hand, and the tooth poles and the yoke, on the other hand, are made of different materials.

10. The synchronous machine of claim 9, wherein the tooth heads are made of magnetizable material, and wherein the tooth poles and yoke are made of amagnetic material.

11. The synchronous machine of claim 5, wherein the the tooth head is made of magnetizable material whereas the shaft and the yoke are made of plastic.

12. The synchronous machine of claim 1, wherein the stator has a stator yoke for connection of the teeth, at least a plurality of the tooth poles being attached to the yoke by a form-fitting connection or by frictional engagement.

13. The synchronous machine of claim 1, wherein the plurality of the tooth poles is attached to the yoke by a snap connection.

14. The synchronous machine of claim 1, wherein the tooth heads have a top face comprised of a sequence of straight sections.

15. The synchronous machine of claim 1, wherein the tooth heads have a curved top face.

16. The synchronous machine of claim 1, wherein the tooth heads have a stepped top face.

17. The synchronous machine of claim 1, wherein each of the tooth heads is defined by a symmetry axis and has a top face which is shallower in a marginal area than in an area adjacent to the symmetry axis.

18. The synchronous machine of claim 1, wherein the permanent magnets are aligned radially inwards in flux concentration direction.

19. The synchronous machine of claim 1, wherein the tooth heads are of salient configuration.

20. The synchronous machine of claim 1, wherein neighboring teeth have different configuration.

21. The synchronous machine of claim 20, wherein the tooth poles of neighboring teeth have different width.

22. The synchronous machine of claim 20, wherein the tooth heads of neighboring teeth have different width.

* * * * *